(12) United States Patent
Bernhardt et al.

(10) Patent No.: US 6,367,789 B1
(45) Date of Patent: Apr. 9, 2002

(54) CLUTCH FOR PIVOTING WORKPIECE SUPPORT

(75) Inventors: John Michael Bernhardt, Mazeppa; Scott Peter Graves, Zumbro Falls, both of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/710,078

(22) Filed: Nov. 9, 2000

Related U.S. Application Data

(62) Division of application No. 09/522,154, filed on Mar. 9, 2000, now Pat. No. 6,227,337.

(51) Int. Cl.$^7$ ................................................ B23Q 1/25
(52) U.S. Cl. .............................. 269/74; 269/58; 188/80
(58) Field of Search ................................ 188/1 D, 180, 188/37, 21, 22, 19, 57, 136, 166; 269/58, 74, 289, 287, 43

(56) References Cited

U.S. PATENT DOCUMENTS

| 4,091,907 A | 5/1978 | Tabler | |
| 4,128,144 A | 12/1978 | Vassar | |
| 4,533,128 A * | 8/1985 | Guigon | 269/74 |
| 4,936,559 A * | 6/1990 | Diaz Torga | 269/69 |
| 5,105,925 A * | 4/1992 | Tremaglio | 192/11 |
| 5,618,228 A * | 4/1997 | Anderson | 451/403 |
| 6,109,145 A * | 8/2000 | Habermehl | 81/434 |
| 6,227,337 B1 * | 5/2001 | Bernhardt et al. | 188/80 |

* cited by examiner

Primary Examiner—Joseph J. Hail, III
Assistant Examiner—Daniel Shanley
(74) Attorney, Agent, or Firm—Wood, Herron & Evans LLP

(57) ABSTRACT

A clutch and a workpiece support incorporating the same selectively restrict rotation of a rotatable member through the use of one or more rollers that are pinched between the outer surface of the rotatable member and corresponding convergent surfaces disposed on a housing opposing such outer surface. In effect, each roller is interposed between a surface on a fixed housing and an outer surface of a rotatable member such that rotation of the rotatable member rolls the roller toward a converging gap to restrict further rotation of the rotatable member. A biasing mechanism biases the roller toward the converging gap, and a release mechanism is utilized to quickly and efficiently decouple the roller from the rotatable member by biasing the roller in a direction away from the converging gap and thereby preventing the roller from inhibiting rotation of the rotatable member.

17 Claims, 4 Drawing Sheets

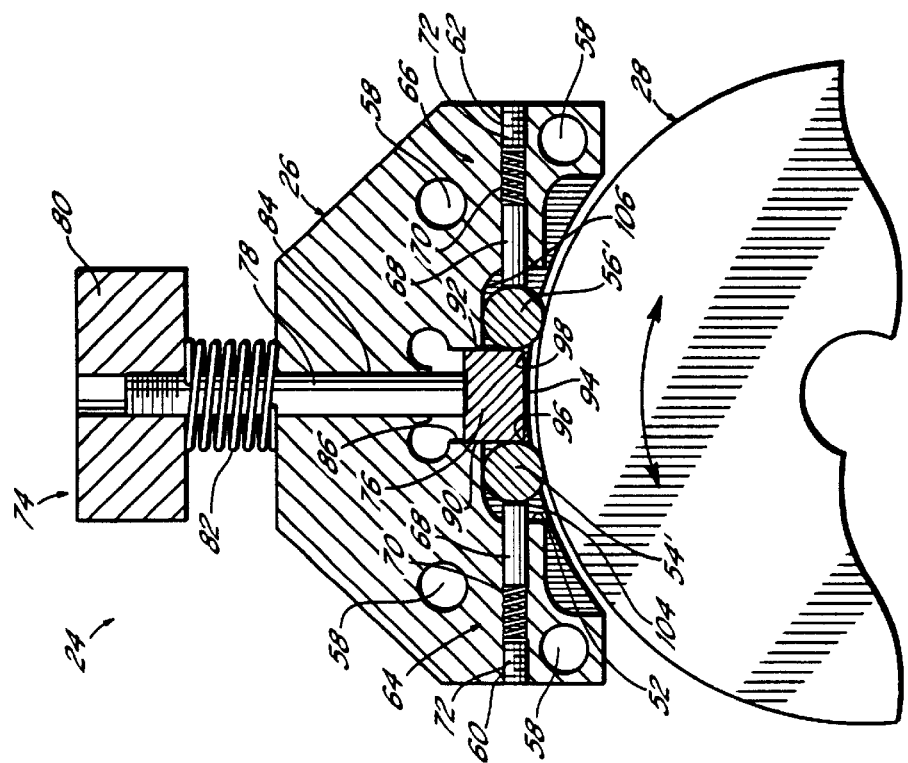
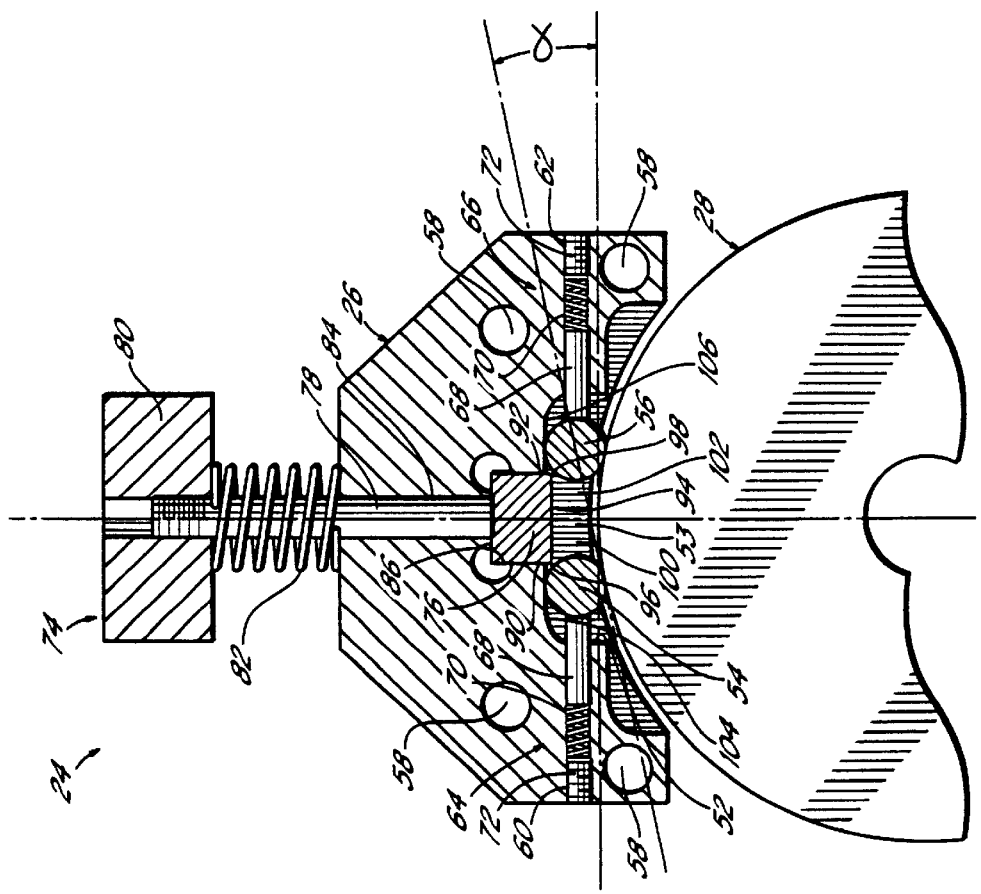
FIG. 3A
FIG. 3B

CLUTCH FOR PIVOTING WORKPIECE SUPPORT

This application is a divisional of U.S. patent application Ser. No. 09/522,154, filed on Mar. 9, 2000 now U.S. Pat. No. 6,227,337 by John Michael Bernhardt et al., which application is incorporated by reference herein.

FIELD OF INVENTION

The invention is related to pivoting workpiece supports and adjustment mechanisms for use therewith.

BACKGROUND OF THE INVENTION

Pivoting workpiece supports are utilized in a number of manufacturing environments to provide a variable orientable work surface for the assembly of components such as printed circuit assemblies, computer hard drives, automotive components, etc.

With a pivoting workpiece support, a platform is pivotably supported on a base, with a rotational coupling utilized to secure the platform support to the base. An adjustment mechanism may also be coupled to the workpiece support to permit an operator to adjust the relative angle of the platform.

One benefit of a pivoting workpiece support is the fact that the platform can be adjusted for use with different operators, or may be adjusted by a single operator to optimize the orientation of the platform for different tasks. In addition, a pivoting platform may also be used to permit multiple sides of a workpiece to be accessed at a comfortable orientation for an operator.

To maximize an operator's productivity when using a workpiece support, it is desirable for the adjustment mechanism to be as fast and easy to operate as possible. Also, given that an operator can exert significant torque while working on a platform, it is also desirable for an adjustment mechanism to be secure and reliable to minimize unwanted movements of the platform.

Conventional adjustment mechanisms such as set screws have been used to selectively lock a platform in a desired rotational orientation for extended periods of time. With a set screw, a threaded screw is oriented perpendicular to a pivot shaft for radial movement relative to the axis of rotation of the pivot shaft. Rotation of the threaded screw applies a force through the end of the screw to the pivot shaft to restrict rotation of the pivot shaft about its axis of rotation.

One problem with set screws and the like is that they are often difficult to manipulate in a fast and efficient manner. Some set screws may require several turns both to release and re-secure the pivot shaft. In addition, the force required to twist a set screw may induce fatigue in an operator, particularly if the operator makes frequent adjustments. As a consequence, set screws are not typically used in environments where repetitive adjustments are required.

One conventional adjustment mechanism utilized in some pivoting workpiece supports is a pawl and ratchet design, where a toothed wheel coupled to a pivot shaft is engaged by a pawl to selectively permit or restrict rotation of the pivot shaft. Other mechanisms utilize a spring-loaded shot pin configured to engage in one of a plurality of holes disposed circumferentially around a shaft. Conventional pawl and ratchet designs and shot pin designs, however, are not infinitely adjustable, and are restricted by the number of teeth disposed on the ratchet or holes disposed on a shaft. Such designs may also be slow and cumbersome, and may require significant effort to operate.

Therefore, a significant need continues to exist in the art for a fast and efficient adjustment mechanism for use with pivoting workpiece supports and the like.

SUMMARY OF THE INVENTION

The invention addresses these and other problems associated with the prior art by providing a clutch and a workpiece support incorporating the same in which rotation of a rotatable member is selectively restricted through the use of one or more rollers that are pinched between the outer surface of the rotatable member and corresponding convergent surfaces disposed on a housing opposing such outer surface. In effect, each roller is interposed between a surface on a fixed housing and an outer surface of a rotatable member such that rotation of the rotatable member rolls the roller toward a converging gap to restrict further rotation of the rotatable member. A biasing mechanism biases the roller toward the converging gap, and a release mechanism is utilized to quickly and efficiently decouple the roller from the rotatable member by biasing the roller in a direction away from the converging gap and thereby preventing the roller from inhibiting rotation of the rotatable member.

Consistent with one aspect of the invention, therefore, a clutch is provided for use in selectively restricting rotation of a rotatable member that rotates within a rotational plane and about an axis of rotation. The rotatable member includes an annular engagement surface circumscribing the axis of rotation. Moreover, the clutch comprises a housing having defined thereon a convergent surface opposing the annular surface of the rotatable member and separated therefrom by a gap that decreases between first and second positions within the rotational plane of the rotatable member. The clutch also includes a roller disposed within the gap between the convergent and annular surfaces, the roller configured to rotate about an axis of rotation that is parallel to the axis of rotation of the rotatable member, and the roller having a diameter that is less than the gap between the convergent and annular surfaces proximate the first position, but is greater than or equal to the gap between the convergent and annular surfaces proximate the second position. The clutch further includes a biasing mechanism coupled to the roller and configured to bias the roller toward the second position to wedge the roller between the convergent and annular surfaces and thereby restrict rotation of the rotatable member, and a release mechanism coupled to the roller and configured to selectively oppose the biasing mechanism to bias the roller toward the first position and permit rotation of the rotatable member.

Consistent with another aspect of the invention, a workpiece support is provided comprising a base and a platform, with the platform pivotably coupled to the base through an adjustment mechanism incorporating a clutch having the features described above to selectively permit pivoting of the platform relative to the base.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 3A is a cross-sectional view of the clutch of FIG. 2, taken through lines 3A—3A thereof.

FIG. 3B is a cross-sectional view of the clutch of FIG. 3A, subsequent to disengaging the clutch.

DETAILED DESCRIPTIONS

Figure 1:
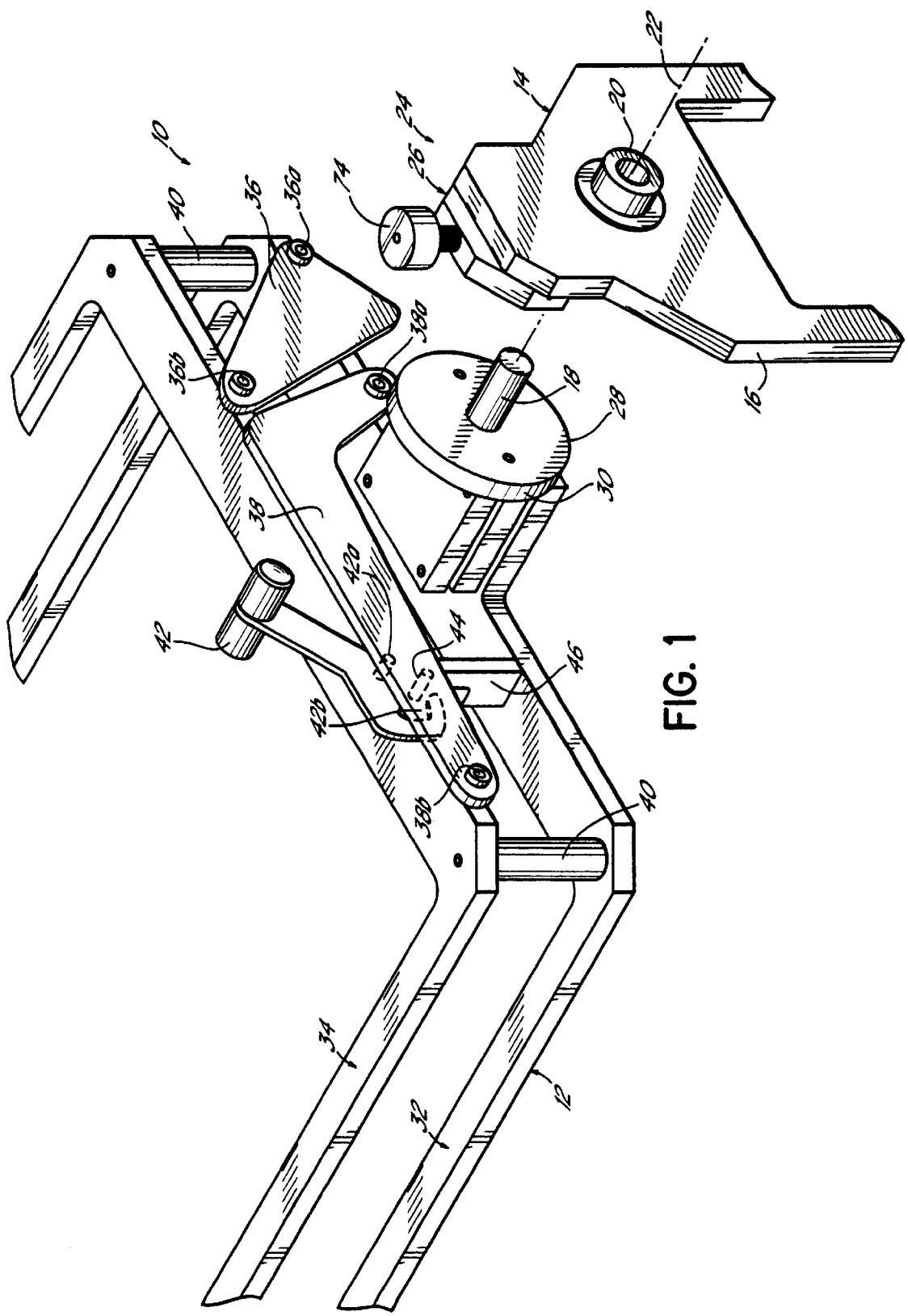
FIG. 1 is a fragmentary perspective view of a workpiece support incorporating a clutch consistent with the invention.

Turning to the drawings, wherein like numbers denote like parts throughout the several views, FIG. 1 illustrates a workpiece support 10 having a platform 12 pivotably coupled to a base 14 through a pair of upright supports 16 (only one of which is shown in FIG. 1). Platform 12 includes opposing shafts 18, each engaging a corresponding bearing 20 in upright support 16 to permit pivoting of the platform about a pivot axis 22.

Pivoting of platform 12 relative to base 14 is selectively enabled through the use of an adjustment mechanism 24 including a clutch 26 engaging a rotatable member 28 including an annular engagement surface 30, which in the illustrated embodiment has a profile of a right cylinder. Further in the illustrated embodiment, the clutch 26 is fixedly mounted to upright support 16, while rotatable member 28 is fixedly mounted to platform 12. It will be appreciated that the clutch 26 and rotatable member 28 may be reversed, and that rotatable member 28 may include alternate engagement surface profiles than that illustrated in FIG. 1.

Platform 12 in the illustrated embodiment forms an integrated work surface and assembly carriage, including first and second opposing frames 32, 34 joined at each end by a pair of hinges 36, 38. Frames 32, 34 are separated from one another by a plurality of standoffs 40 secured at each corner of frame 34. The frames are selectively locked in the configuration shown in FIG. 1 by pivoting a latch 42 mounted on frame 34 about a shaft 42a to engage a catch 44 disposed on an upright support 46 secured to frame 32. Latch 42 includes a slot 42b that engages catch 44, which is implemented as a roller in the illustrated embodiment.

When the latch 42 (as well as a corresponding latch at the opposite end of platform 12 (not shown)) is in the position illustrated in FIG. 1, frames 32 and 34 are capable of being pivoted away from one another, with the configuration of hinges 36, 38 (specifically the relative distances between hinge points 36a and 36b, and 38a and 38b) selected to initially separate the frames in a direction generally perpendicular to the planes of frames 32, 34, and then swing open in much the manner as a clam shell.

Each of frames 32, 34 is configured to receive a removable panel (not shown) secured by one or more clamps to, in effect, provide an assembly clamp with which components can be assembled together on a printed circuit board.

Figure 2:
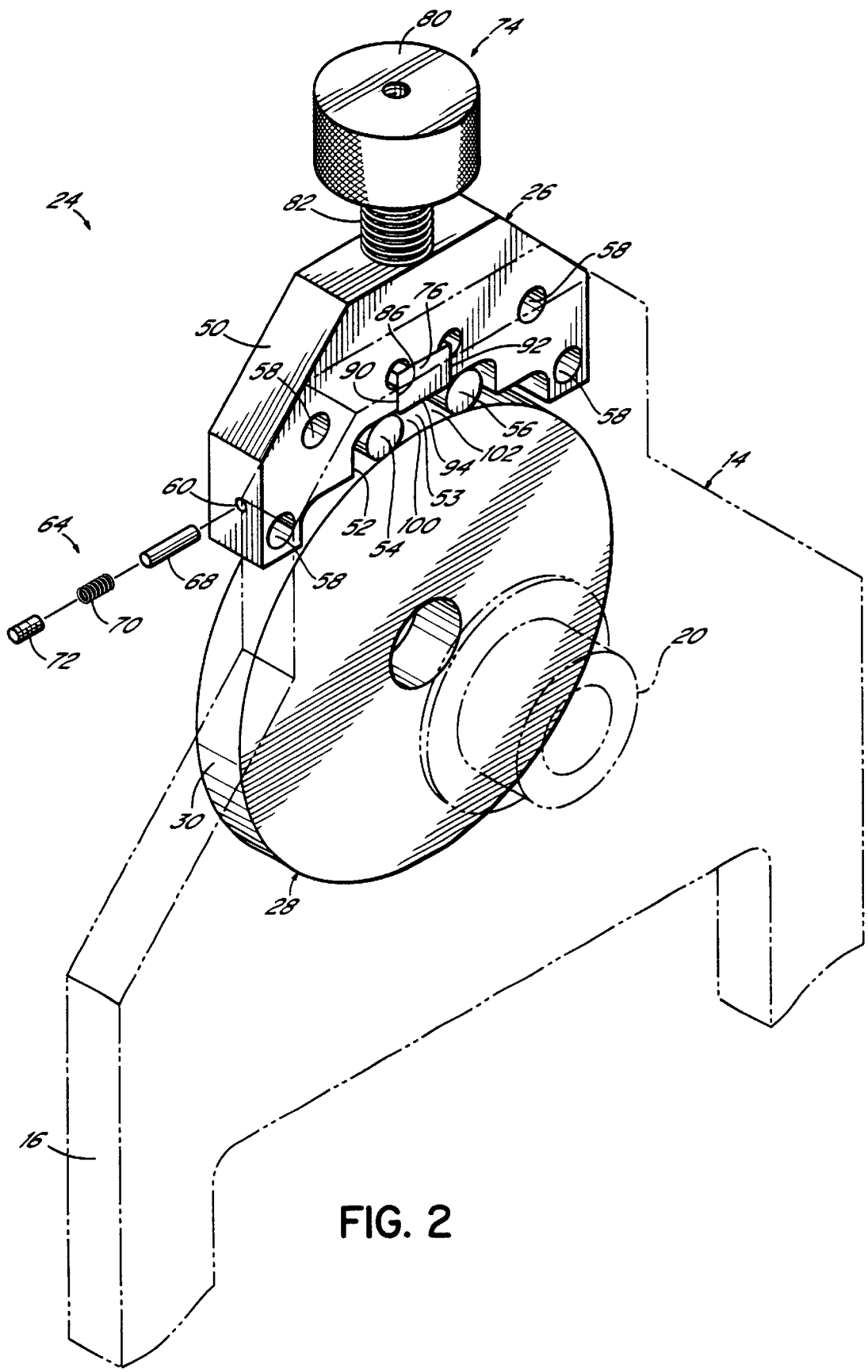
FIG. 2 is a partially-exploded perspective view of the clutch of FIG. 1.

Adjustment mechanism 24 is illustrated in greater detail in FIGS. 2, 3A–3B and 4. As best shown in FIG. 2, adjustment mechanism 24 includes a clutch 26 incorporating a housing 50 having a wall formed thereon at 52 that cooperates with rotatable member 28 to define a chamber 53 within which is retained a pair of rollers 54, 56. A plurality of bores 58 are also provided in housing 50 to secure housing 50 to upright support 16 of base 14.

Housing 50, rollers 54, 56 and rotatable member 28 may be constructed of different materials, e.g., hardened tool steel with a hardness of about R/C 58–60.

As best shown in FIG. 3A, housing 50 also includes a pair of bores 60, 62 extending along the plane of rotation of rotatable member 28 to respectively retain a biasing mechanism 64, 66 that biases a corresponding roller 54, 56 toward a convergent gap within which the roller resides. Each biasing mechanism 64, 66 includes a pin 68 biased by means of a spring 70, and retained within the respective bore 60, 62 by a set screw 72. It will be appreciated that other biasing mechanisms may be utilized consistent with the invention, including other spring designs, as well as non-mechanical biasing structures incorporating the use of pressurized fluid, electromagnetic force, etc. Moreover, each biasing mechanism may apply a bias directly to each roller, or may supply a biasing force to other structures, e.g., an axle about which each roller rotates. Other modifications will be apparent to one of ordinary skill in the art having the benefit of the instant disclosure.

Clutch 26 also includes a release mechanism 74, implemented in the illustrated embodiment by a spring-loaded plunger including a wedge body 76 mounted at one end of a shaft 78, with a handle 80 secured to the opposite end of the shaft and biased to a disengaged position by a spring 82. Housing 50 includes concentric bores 84, 86 that respectively receive shaft 78 and wedge body 76.

In the illustrated embodiment, wedge body 76 has opposing engagement surfaces 90, 92 that extend generally parallel to one another and in the direction of actuation of release mechanism 74. The opposing engagement surfaces are joined by an end surface 94 extending perpendicular thereto. Further, the edges 96, 98 along which end surface 94 engages engagement surfaces 90, 92 are beveled, e.g., with a 45 degree chamfer. It will be appreciated that other wedge profiles may be utilized in the alternative, e.g., converging surfaces 90, 92; various edge bevels; e.g., rounded, mitered; etc.

In the illustrated implementation, release mechanism 74 is a momentary-type release mechanism, whereby no detent or other structure is provided to lock or otherwise hold release mechanism 74 in an engaged position. In other embodiments, however, it may be desirable to provide such additional functionality for the release mechanism to maintain the clutch in a disengaged configuration. Also, release mechanism 74 may be biased toward an engaged position in other embodiments so the rotatable member 28 is normally free to rotate.

As discussed above, FIG. 3A illustrates clutch 26 in a disengaged configuration, with release mechanism 74 disengaged, and as a consequence, rotatable member 28 prevented from rotating relative to the clutch. Each roller 54, 56 is retained within a converging gap 100, 102.

Figure 4:
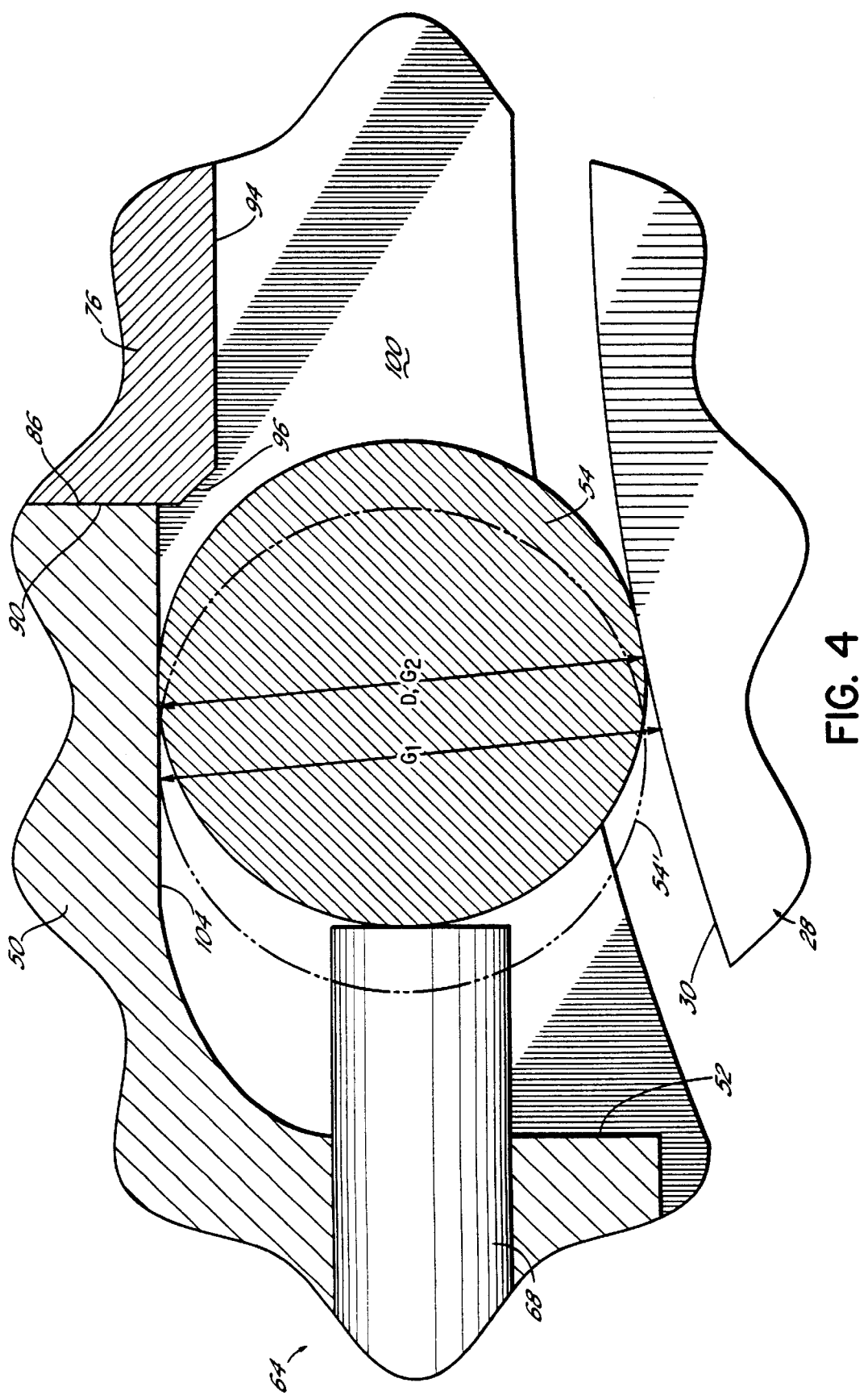
FIG. 4 is an enlarged cross-sectional view of one of the rollers in the clutch of FIG. 2, illustrating the relative dimensions of the roller to the converging gap within which the roller resides.

As best shown in FIG. 4, gap 100 is defined between a convergent surface 104 defined on wall 52 of housing 50 and annular surface 30 of rotatable member 28. The gap 100 converges in the direction of bias applied by biasing member 64. The 20 diameter D of roller is selected such that, when release mechanism 74 is disengaged, the roller 54 is biased to a position in the convergent gap where the diameter of roller 54 is greater than or equal to the length of the gap (denoted at $G_2$). As such, roller 54 is placed in engagement with both surfaces 30, 104.

Now turning to FIG. 3B, upon actuation of release mechanism 74, wedge 76 is interposed between rollers 54, 56, displacing these rollers to the positions illustrated at 54', 64'. Returning to FIG. 4, it may be seen that when roller 54 is displaced to the position shown at 54', the diameter D of the roller is less than the length of gap 100 illustrated at $G_1$. As such roller 54 does not simultaneously engage both of surfaces 30, 104, and rotatable member 28 is thus free to rotate relative to the clutch.

It will be appreciated that the width of wedge body 76 is selected relative to the separation of the rollers to ensure that the wedge will displace each of the rollers when the release mechanism is engaged.

One important feature of the illustrated embodiment is that, when the release mechanism 74 is not actuated and roller 54 engages both of surfaces 30, 104, torque applied to rotatable member 28 that urges surface 30 in a direction toward the converging gap (clockwise in the illustrated embodiment), will urge roller 54 to rotate in a contrary direction, which urges the roller into converging gap 100. The force that restricts further rotation of the rotatable member 28 therefore increases in proportion with the force applied to rotate the member.

It may be seen that rotation of rotatable member 28 in an opposite direction will have an opposite effect, that of urging roller 54 to move toward the position illustrated at 54', thereby overcoming the bias applied by biasing mechanism 64. However, with the corresponding structure utilized for roller 56, such opposite movement will urge roller 56 into its converging gap 102, thereby restricting rotation of the rotatable member 28 in the opposite direction. As such, the combination of rollers 54 and 56 restrict all rotation of rotatable member 28 relative to clutch 26.

It should be appreciated that, in other embodiments, it may be desirable to incorporate only one roller, thereby omitting the second roller. Such implementations may be desirable to provide one-way clutching functionality.

In the illustrated implementation, the diameter of each roller 54, 56 is about 0.375 inches, with the length of the gap at the engaged position ($G_2$) equal to about 0.375 inches. The length of the gap at the disengaged position ($G_1$ where the roller engages the engaging surface of wedge body 76), is about 0.390 inches.

The position at which the diameter of the roller equals the length of the gap is selected to ensure that the rollers are easily displaced by the release mechanism when the clutch is in an engaged configuration. This is ensured in the illustrated embodiment by configuring convergent surface 104 (and surface 106) to provide a gap that roughly equals the diameter of the roller when the roller is in a position where its tangent to the rotatable member forms an angle α with a tangent taken through the centerline of release mechanism 74, with α between about 11.0 and 12.0 degrees, e.g., about 11.5 degrees in the illustrated embodiment. It is also to be noted that wedge 76 does project somewhat into gap 102 when in a disengaged position to limit the amount that each roller 54, 56 can be urged into the respective convergent gaps in response to torque applied to rotatable member 28.

Therefore, in the illustrated embodiment, clutch 26 is actuated by applying a radial force to release mechanism 74 to displace rollers 54, 56 outwardly relative to one another, thereby overcoming the bias mechanisms 64, 66 and freeing rotatable member 28 to rotate relative to the clutch. Upon disengagement of release mechanism 74, spring 82 moves the wedge body 76 to a disengaged position, thereby permitting rollers 54, 56 to be biased inwardly relative to one another and into the respective converging gaps to restrict rotation of the rotatable member.

Returning to FIG. 1, in use, workpiece support 10 may be utilized in a printed circuit board assembly process to assemble components on a printed circuit board. A typical assembly process utilizing workpiece support 10 incorporates releasing latches 42 and separating frames 32, 34 into an open configuration. Suitable panels are installed within each of frames 32 and 34, including, for example, a padded surface on the underside of the panel attached to frame 34, and an apertured panel retained by frame 32 to permit access to the underside of the assembly. A circuit board is placed onto the panel retained by frame 32 overlaying one or more apertures in the panel, and centered by means of suitable structure disposed on the panel. Components to be attached to the printed circuit board are placed on top of the circuit board in appropriate locations, and the frame 34 is then brought down to engage the pad on the underside of the panel retained by the frame with the components placed on top of the circuit board. Latches 42 are then actuated to secure frames 32, 34 to one another with the components in the printed circuit board assembly sandwiched together. It will be appreciated that standoffs 40 provide the appropriate separation for the particular components being assembled.

Once frames 32, 34 are engaged to one another via latches 42, adjustment mechanism 24 is activated by engaging release mechanism 74, and platform 12 is then rotated about 180° to orient the underside of the printed circuit board in a convenient location for an operator. Apertures in the panel retained by frame 32 are then utilized to apply any fasteners or other components to the underside of the printed circuit board to complete the assembly process. Release mechanism 74 is then engaged a second time, and platform 12 is rotated approximately another 180° to return the platform to its original orientation, and thereby permit the operator to disengage latches 42, separate frames 32, 34, and remove the assembled components.

It will be appreciated that, by utilizing different panels in each of frames 32, 34, and by optionally replacing standoffs 40, a wide variety of assemblies may be constructed using the same overall workpiece support hardware. As such, workpiece support 10 can be an extremely flexible and versatile manufacturing tool suitable for use in a wide variety of applications.

It will also be appreciated that, during any of the aforementioned assembly steps, adjustment mechanism 24 permits infinite adjustability of platform 12 relative to base 14. As such, an operator can adjust the platform as he or she desires to optimize the comfort and convenience of the device.

Various modifications may be made to the illustrated embodiments without departing from the spirit and scope of the invention. For example, while convergent surface 104 on housing 50 is illustrated as a planer surface that is parallel to a tangent of the rotatable member, it will be appreciated that various surface profiles that provide a converging gap relative to rotatable member 28 may be utilized in the alternative. Moreover, while rollers 54, 56 are circumferentially oriented around rotatable member 28 to permit a single wedge body 76 to separate the rollers, it will be appreciated that different circumferential orientations of the two rollers may be utilized in other embodiments. Moreover, separate release mechanisms may be utilized for each roller if desired.

Each roller 54, 56 further need not occupy the same rotational plane of rotatable member 28. Moreover, in the illustrated embodiment, each roller is simply located within its respective converging gap, without any separate mechanism retaining the roller. In other embodiments, however, it may be desirable to support each roller on an axle and retain the ends of the axle to maintain the axis of rotation of the roller in parallel with that of the rotatable member. Moreover, while the convergent surfaces for the respective rollers 54, 56 are illustrated in the same plane, such surfaces may be different profiles.

Other modifications will be apparent to one of ordinary skill in the art. Therefore, the invention lies in the claims hereinafter appended.

What is claimed is:

1. A workpiece support, comprising:
   (a) a base;
   (b) a platform; and
   (c) an adjustment mechanism coupled between the base and the platform to selectively enable pivoting of the platform relative to the base, the adjustment mechanism comprising:
      (i) a rotatable member coupled in a fixed position relative to one of the base and the platform, the rotatable member configured to rotate within a rotational plane and about an axis of rotation, the rotatable member including an annular engagement surface circumscribing the axis of rotation;
      (ii) a housing coupled in a fixed position relative to the other of the base and the platform, the housing having defined thereon a convergent surface opposing the annular surface of the rotatable member and separated therefrom by a gap that decreases between first and second positions within the rotational plane of the rotatable member;
      (iii) a roller disposed within the gap between the convergent and annular surfaces, the roller configured to rotate about an axis of rotation that is parallel to the axis of rotation of the rotatable member, and the roller having a diameter that is less than the gap between the convergent and annular surfaces proximate the first position, but is greater than or equal to the gap between the convergent and annular surfaces proximate the second position;
      (iv) a biasing mechanism coupled to the roller and configured to bias the roller toward the second position to wedge the roller between the convergent and annular surfaces and thereby restrict rotation of the rotatable member; and
      (v) a release mechanism coupled to the roller and configured to selectively oppose the biasing mechanism to bias the roller toward the first position and permit rotation of the rotatable member to pivot the work surface relative to the base.

2. The workpiece support of claim 1, wherein the base includes opposing first and second upright supports, and wherein the platform includes first and second shafts extending in opposite directions along a pivot axis, the first and second shafts rotatably coupled to the first and second upright supports, respectively.

3. The workpiece support of claim 2, wherein the rotatable member is fixedly coupled to the first shaft, and wherein the housing is fixedly coupled to the first upright support.

4. The workpiece support of claim 3, wherein the convergent surface is a first convergent surface, the gap is a first gap, the roller is a first roller, and the biasing mechanism is a first biasing mechanism, the adjustment mechanism further comprising:
   (a) a second convergent surface disposed on the housing and opposing the annular surface of the rotatable member, the second convergent surface separated from the annular surface by a second gap that decreases between third and fourth positions within the rotational plane of the rotatable member;
   (b) a second roller disposed within the second gap between the second convergent and annular surfaces, the second roller configured to rotate about an axis of rotation that is parallel to the axis of rotation of the rotatable member, and the second roller having a diameter that is less than the second gap between the second convergent and annular surfaces proximate the third position, but is greater than or equal to the second gap between the second convergent and annular surfaces proximate the fourth position; and
   (c) a second biasing mechanism coupled to the second roller and configured to bias the second roller toward the fourth position to wedge the second roller between the second convergent and annular surfaces and thereby restrict rotation of the rotatable member.

5. The workpiece support of claim 4, wherein the release mechanism is further configured to selectively oppose the second biasing mechanism to bias the second roller toward the third position and permit rotation of the rotatable member.

6. The workpiece support of claim 5, wherein the first and second convergent surfaces are circumferentially oriented about the axis of rotation of the rotatable member, with the second and fourth positions interposed between the first and third positions; whereby the first and second rollers are configured to respectively restrict rotation of the rotatable member in first and second directions.

7. The workpiece support of claim 6, wherein the release mechanism comprises a wedge movable radially with respect to the rotatable member between a disengaged position and an engaged position intermediate the first and second rollers.

8. The workpiece support of claim 7, wherein the first and second convergent surfaces each extend generally parallel to a tangent of the annular surface.

9. The workpiece support of claim 8, wherein the wedge includes first and second engagement surfaces separated by a width that is greater than a separation between the first and second rollers when the first and second rollers are biased to the second and fourth positions, respectively.

10. The workpiece support of claim 9, wherein the first and second engagement surfaces are generally parallel to one another, wherein the wedge further includes an end surface extending perpendicular to the first and second engagement surfaces, and wherein the wedge is beveled along intersections of the end surface with the first and second engagement surfaces.

11. The workpiece support of claim 7, wherein the release mechanism further comprises a spring-loaded plunger coupled to the wedge and configured to bias the wedge toward the disengaged position.

12. The workpiece support of claim 11, wherein the spring-loaded plunger includes a handle.

13. The workpiece support of claim 11, wherein the release mechanism is configured as a momentary release mechanism.

14. The workpiece support of claim 4, wherein the first and second biasing mechanisms respectively comprise first and second spring-loaded pins abutting the first and second rollers, respectively.

15. The workpiece support of claim 1, wherein the roller is configured to roll along each of the convergent and annular surfaces toward the second position in response to torque applied to the rotatable member to rotate the rotatable member in a direction from the first position to the second position.

16. The workpiece support of claim 1, wherein the release mechanism includes a wedge movable radially with respect to the rotatable member between a disengaged position and an engaged position proximate the roller.

17. The workpiece support of claim 1, wherein the biasing mechanism includes a spring-loaded pin abutting the roller.

* * * * *